United States Patent [19]
de Queiroz

[11] Patent Number: 5,867,598
[45] Date of Patent: Feb. 2, 1999

[54] METHOD AND APPARATUS FOR PROCESSING OF A JPEG COMPRESSED IMAGE

[75] Inventor: Ricardo L. de Queiroz, Fairport, N.Y.

[73] Assignee: Xerox Corporation, Stamford, Conn.

[21] Appl. No.: 721,130

[22] Filed: Sep. 26, 1996

[51] Int. Cl.[6] .............................. G06K 9/36; G06K 9/46; G06K 9/32

[52] U.S. Cl. ......................... 382/235; 382/250; 382/293; 382/295; 382/296

[58] Field of Search .................................... 382/233, 235, 382/244, 246, 248, 250, 276, 293, 295, 296, 297

[56] References Cited

U.S. PATENT DOCUMENTS

| | | | |
|---|---|---|---|
| 5,257,113 | 10/1993 | Chen et al. | 358/426 |
| 5,319,724 | 6/1994 | Blonstein et al. | 382/56 |
| 5,327,248 | 7/1994 | Miller et al. | 358/261.4 |
| 5,408,425 | 4/1995 | Hou | 364/725 |

OTHER PUBLICATIONS

Bo Shen, Ishwar K. Sethi: Inner–Bloeu Operations on Compressed Images, ACU Multimedia 95–Electronic Proceedings, Nov. 5–9, 1995, pp. 1–15.

William P. Pennebaker et al.; JPEG: Still Image Data Compression Standard; pp. 34 and 170.

Brian C. Smith and Lawrence A. Rowe; A New Family of Algorithms for Manipulating Compressed Images; pp. 1–20.

Michael Shneier and Mohamed Abdel–Mottaleb; Exploiting the JPEG Compression Scheme for Image Retrieval; IEEE Transactions on Pattern Analysis and Machine Intelligence; vol. 18 No. 8, Aug. 1996.

James D. Murray and William van Ryper; Encyclopedia of Graphics File Formats; Jul. 1994; pp. 158–171 and 376–383.

Xerox Disclosure Journal; Michael J. Denber; *Fast Small–Angle Bitmap Rotation*; vol. 17 No. 5 Sep./Oct. 1992; pp. 391–392.

Xerox Disclosure Journal; Robert V. Lorenze, Jr.; *Simple and Compact Method For Automated Duplex Printing*; vol. 21, No. 1 Jan./Feb. 1996; pp. 17–18.

*Primary Examiner*—Leo H. Boudreau
*Assistant Examiner*—Dmitry A. Novik
*Attorney, Agent, or Firm*—Duane C. Basch

[57] ABSTRACT

The present invention is a method and apparatus for the processing of images that have been compressed using a discrete cosine transform operation, and particularly JPEG compressed images. In a preferred embodiment, the rotation of image blocks is accomplished by sign inversion and transposition operations to accomplish intrablock operations. Subsequently, one of a number of alternative methods is employed to accomplish the same image processing on an interblock level, thereby enabling the rotation or mirroring of compressed images. The two stage process allows the use of either a standardized JPEG system with enhancements or a hybrid processing method, thereby accomplishing the image processing in conjunction with compression or decompression operations and minimizing the need for large memory buffers to accomplish the image processing. Accordingly, the technique has application to any number of systems, including digital printers and copiers where there may be a necessity to orthogonally rotate or mirror the digital image.

8 Claims, 6 Drawing Sheets

METHOD AND APPARATUS FOR PROCESSING OF A JPEG COMPRESSED IMAGE

This invention relates generally to the processing of compressed digital images, and more particularly to a method and apparatus for accomplishing the rotation, mirroring, or transposition of a JPEG compressed image so as to reduce the memory requirements for processing of the image.

CROSS REFERENCE

The following related applications are hereby incorporated by reference for their teachings:

"Method And Apparatus for Image Rotation with Reduced Memory Using JPEG Compression," Felice A. Micco and Martin E. Banton, application Ser. No. 08/721,127, filed concurrently herewith; and "Compression of Image Data with Retaining Cost Data for Each Image Block," Ricardo L. deQueiroz, application Ser. No. 08/721,519, filed concurrently herewith.

BACKGROUND AND SUMMARY OF THE INVENTION

The present invention is directed to reducing the memory necessary to accomplish the processing of a digital image. In particular, this invention capitalizes on the need to store digitized images in a compressed format, and incorporates rotation, mirroring, and transposition operations with a JPEG (Joint Photographic Experts Group) standard compression or decompression operation so as to accomplish rotation, mirroring and transposition on compressed images in a computationally efficient manner.

Data compression is required in data handling processes, where too much data is present for practical applications using the data. Commonly, compression is used in communication links, to reduce the transmission time or required bandwidth. Similarly, compression is preferred in image storage systems, including digital printers and copiers, where "pages" of a document to be printed are stored temporarily in precollation memory. Here the amount of media space on which the image data is stored can be substantially reduced with compression. Generally speaking, scanned images, i.e., electronic representations of hard copy documents, are often large, and thus make desirable candidates for compression.

The DCT (Discrete Cosine Transform) and variable-length encoding standard, disseminated by the JPEG committee, is a lossy compression system which reduces data redundancies based on pixel to pixel correlations. Generally, an image does not change very much on a pixel to pixel basis and therefore has what is known as "natural spatial correlation". In natural scenes, correlation is generalized, but not exact. Noise makes each pixel somewhat different from its neighbors.

Generally, FIG. 1 illustrates a JPEG DCT compression and decompression system. A more complete discussion may be had by referencing the *Encyclopedia of Graphics File Formats*, by J. D. Murray and W. vanRyper, pp. 159–171 (1994, O'Reilly & Associates, Inc.) Further description of the JPEG standard may be found, for example, in *JPEG Still Image Data Compression Standard*, by W. Pennebaker and J. Mitchell, 1993 (Van Nostrand Reinhold, New York) or *Discrete Cosine Transform: Algorithms, Advantages and Applications*, by K. Rao and P. Yip, 1990 (Academic Press, San Diego).

Initially provided is tile or block memory 10 storing an M×M segment of the image. From the portion of the image stored in memory, the discrete cosine transform (DCT), a frequency space representation of the image, is formed at transformer 12. Hardware implementations of the compression engine are available, such as the C-Cube Microsystems CL550A JPEG image compression processor, which operates in either the compression or the decompression mode according to the JPEG standard. As described below, the embodiments of the present invention may include hardware and/or software processing operations. A divisor/quantization device 14 is used, from a set of values referred to as a Q-Table stored in a Q-Table memory 16, so that a distinct Q-Table value is divided into the DCT value, returning the integer portion of the value as the quantized DCT value. A Huffman encoder 18 uses statistical encoding applied to the quantized DCT values to generate the compressed image in a variable-length coded unit that is output for storage, transmission, etc.

To decompress compressed image data, and with continued reference to FIG. 1, a series of functions or steps are followed to reverse the compression process described above. The Huffman encoding is removed at decoder 20. The image signal now represents the quantized DCT coefficients, which are multiplied at signal multiplier 22 by the Q-Table values in memory 24 in a process inverse to the compression process. At inverse transformer 26, the inverse transform of the discrete cosine transform is derived, and the output image in the spatial domain is stored at image buffer 28.

As the processing of JPEG compressed images is typically accomplished in the spatial domain, such processes generally require the decompression of the image before processing and the re-compression after processing to minimize image size. An object of the present invention is to accomplish the orthogonal rotation and/or mirroring of the M×M blocks within a JPEG compressed image without having to completely decompress the coded units representing such blocks. The proposed invention employs a two-step process to accomplish orthogonal increment rotation or mirroring, requiring only an intermediate buffer having a storage capacity approximately on the order of the coded unit itself. Thus, for any image having a compression ratio of at least two, there is a memory savings with the processing technique of the present invention relative to accomplishing the processing in a spatial domain. Accordingly, the present invention enables the rotation and mirroring of an image by processing only the compressed data, with no a priori knowledge of the structure of the compressed image.

Heretofore, a number of patents and publications have disclosed image compression or rotation operations, the relevant portions of some may be briefly summarized as follows:

U.S. Pat. No. 5,408,425 to H. S. Hou, issued Apr. 18, 1995, hereby incorporated by reference for its teachings, discloses a processor and method of computation for performing a discrete cosine transform.

U.S. Pat. No. 5,319,724 to S. M. Blonstein et al., issued Jun. 7, 1994, teaches an apparatus and corresponding method for compressing still images while remaining compatible with a JPEG transformation.

U.S. Pat. No. 5,257,113 to Chen et al., issued Oct. 26, 1993, discloses a video mixing technique that employs JPEG compressed data. Windows within a video image are each represented as JPEG coded data streams. The streams are then mixed using a data structure, based upon the overlay configuration of the windows, to produce a composite frame of video information.

U.S. Pat. No. 5,327,248 to Miller et al., issued Jul. 8, 1994, teaches a compressed image virtual editing system, where the compressed image is the result of JPEG compression techniques. The system enables a decoding of selected blocks in the JPEG compressed image to create a virtual image. Subsequently, the virtual image may be edited and re-encoded thereby allowing editing of the virtual image only and without decoding the entire compressed image.

In accordance with the present invention, there is provided a method for performing an image processing operation on compressed digital image data comprising a plurality of coded units, wherein each coded unit is a variable-length representation of the coefficients of a discrete cosine transform for a segment of a digital image, the method including the steps of: retrieving from a memory a coded unit; at least partially variable-length decoding the coded unit to produce a quantized coefficient matrix; processing the quantized coefficient matrix in accordance with the image processing operation to produce a processed coefficient matrix; variable-length encoding the processed coefficient matrix to produce a processed coded unit; and repeating the above steps for each of the plurality of coded units in the compressed digital image data to produce coded units of a processed, compressed image.

In accordance with another aspect of the present invention, there is provided a method for performing an image processing operation on compressed digital image data comprising a plurality of coded units, wherein each coded unit is a variable length representation of the coefficients of a discrete cosine transform for a segment of a digital image, the method including the steps of: retrieving from a memory a coded unit; variable-length decoding the coded unit to produce a quantized coefficient matrix, said decoding step further determining the size of the coded unit; storing, in memory, a pointer to each coded unit reflecting the storage location, in memory of the DC offset component for the coded unit; processing the quantized coefficient matrix in accordance with the image processing operation to produce a processed matrix; dequantizing the processed matrix to produce a processed array of quantized coefficients; inverse discrete cosine transforming the processed array of quantized coefficients to produce a processed image segment; and repeating the above steps for each of the plurality of coded units in the compressed digital image data to produce a plurality of processed segments of image data.

In accordance with yet another aspect of the present invention, there is provided a method for performing an image processing operation on digital image data, including the steps of: segmenting the digital image data into blocks of data; transforming, using a discrete cosine transform, each block of data to produce DCT coefficients representative thereof; quantizing the DCT coefficients to produce a quantized DCT coefficient matrix for each block of data; processing the quantized coefficient matrix in accordance with the image processing operation to produce a processed coefficient matrix for each block of data; scanning the processed coefficient matrix in accordance with a predefined path to produce a vector of quantized coefficients for each block of data; compressing the quantized coefficient vector using variable length encoding so as to produce a processed coded unit for each block of data; and storing the plurality of coded units in memory to produce a processed, compressed image One aspect of the invention deals with a basic problem in digital image processing systems—the memory and computationally intensive operation of image processing, particularly image rotation. This aspect is further based on the discovery of a technique that alleviates this problem. The technique accomplishes the processing of an image segment or block while in a compressed form produced by a JPEG (e.g., discrete cosine transform) compression operation.

This technique can be implemented, for example, by the modification of a basic JPEG compression engine, where rotation operations are performed on the compressed image data (coded units). Accordingly, the technique has application to any number of systems, including digital printers and copiers where there may be a necessity to orthogonally rotate the digital image. A machine implementing the invention can include a data or image processing system having the capability of JPEG compression. The techniques and system described herein are advantageous because they are efficient and result in the ability to accomplish basic image processing with little additional hardware or processing as compared to other memory intensive approaches.

Figure 1:
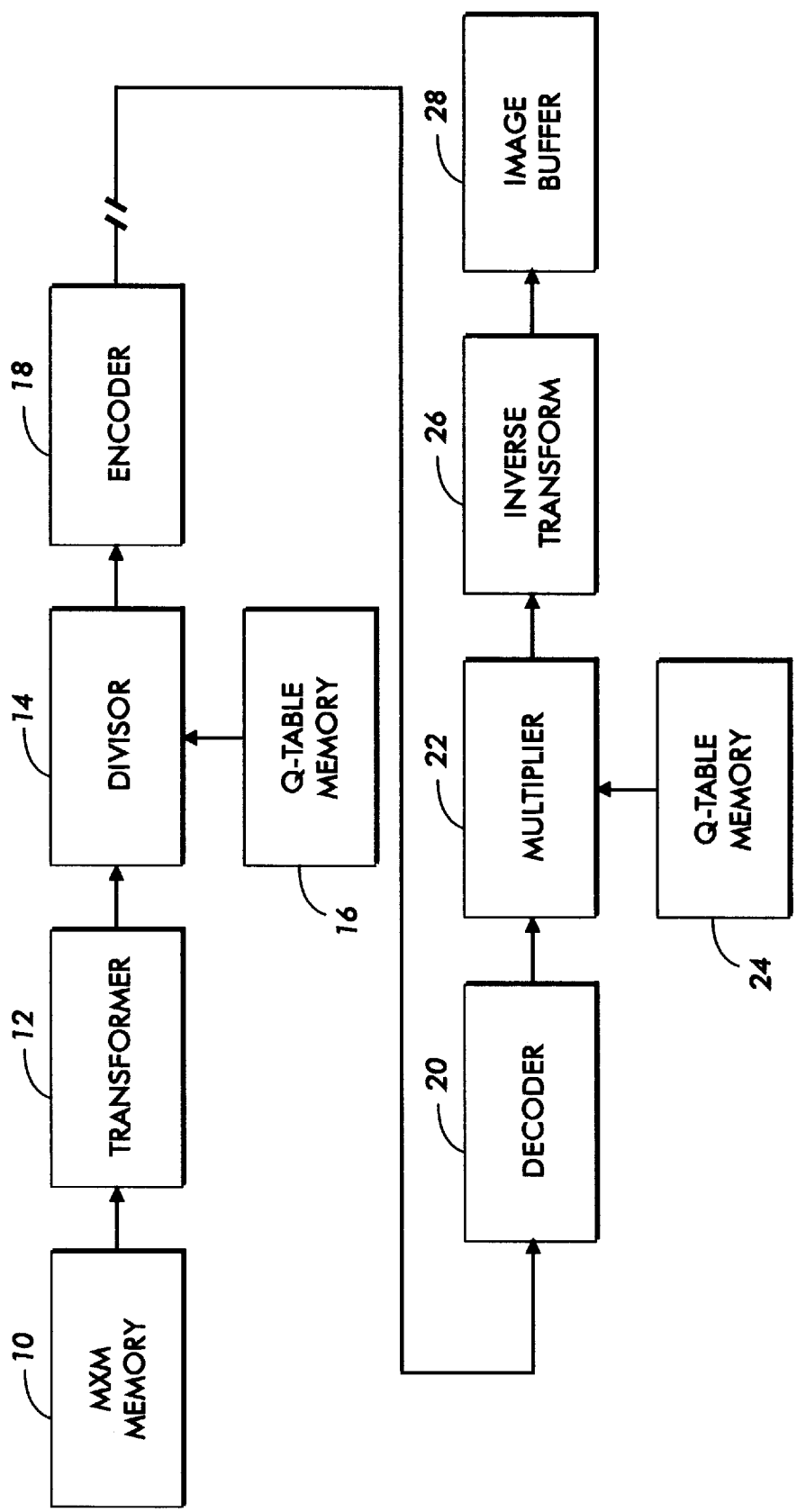
FIG. 1 is a block representation of a prior art JPEG digital image compression-decompression system.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

An "image" is a pattern of physical light. An image may include characters, words, and text as well as other features such as graphics. A text may be included in a set of one or more images, such as in images of the pages of a document. An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image. An item of data "defines" an image set when the item of data includes sufficient information to produce all the images in the set.

A "pixel" is the smallest segment into which an image is divided in a given system. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

"Circuitry" or a "circuit" is any physical arrangement of matter that can respond to a first signal at one location or time by providing a second signal at another location or time.

A "memory" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs.

A "data processing system" is a physical system that processes data. A "data processor" or "processor" is any component or system that can process data, and may include one or more central processing units or other processing components.

A "data unit" or "unit of data" is an item of data that a processor can access or otherwise operate on as a unit. For example, an eight-bit byte is a data unit in many data processing systems. A "block" of items of data is a number of items of data that form a sequence. For example, a block or segment of an image would include data or signals representative of image pixels within a defined region of the image.

An "address" is an item of data that can be used to address a memory cell within memory circuitry that includes plural memory cells.

Stored data can be "accessed using" or "accessible using" other data if the memory containing the stored data responds to the other data or to data that depends on the other data by permitting access to the stored data. For example, the other data may be an address, an offset used to produce an address, or a content-addressable value stored with the stored data.

An operation "encodes" items of data when performing the operation on the items of data produces different items of data from which the encoded data items can subsequently be recovered. The operation that recovers the encoded data items is "decoding."

An "image input terminal" (IIT) is a device that can generate or receive an image and provide an item of data defining a version of the image. A "scanner" is an image input device that receives an image by a scanning operation, such as by scanning a document. Other image input terminals include facsimile machines computer graphic workstations.

An "image output terminal" (IOT) is a device that can receive an item of data defining an image and provide the image as output. A "display" is an image output device that provides the output image in human viewable form. The visible pattern presented by a display is a "displayed image" or simply "image."

Figure 2:
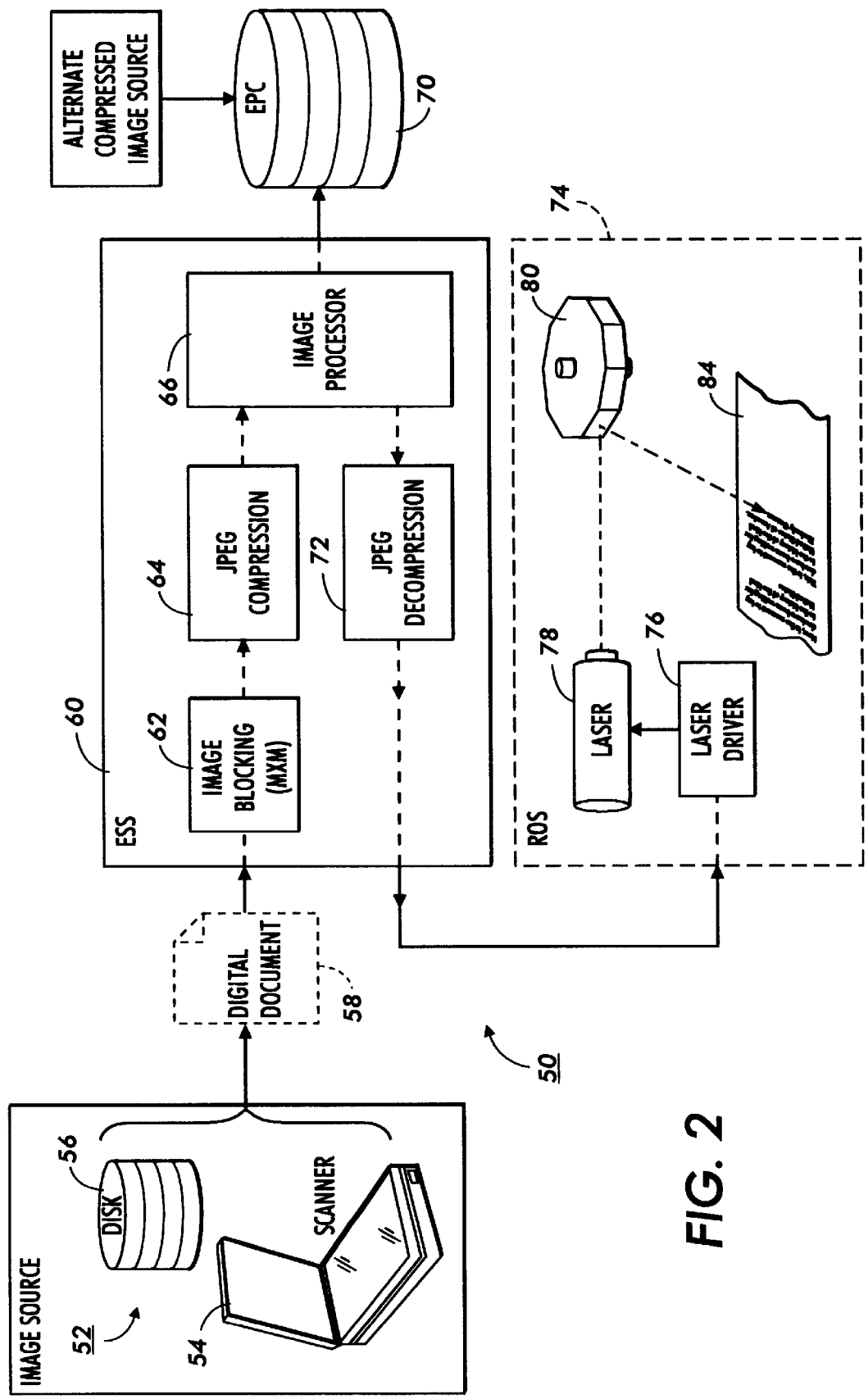
FIG. 2 is a block diagram of an exemplary printing system proving an embodiment for the present invention.

Turning now to FIG. 2 displayed therein is a block diagram of a digital printing system 50 in which the present invention finds particular use. System 50 includes an image input terminal (IIT) 52 that may include any number of image sources such as a scanner 54 or storage medium (disk) 56 suitable for generating or otherwise providing a digital document 58. A digital document containing an image is the output of the IIT, and is provided to image handler 60 that forms a part of the printing system. Image handler 60, while preferably providing additional functionality, includes an electronic subsystem (ESS) for carrying out the image processing and compression operations in accordance with the present invention. In particular, image handler 60 includes an image blocking circuit 62 capable of dividing the digital data representing the image into a plurality of M×M blocks or segments. In one embodiment, the blocking operation may be accomplished by a windowing or cropping circuit that enables the transfer of data comprising one or more M×M blocks of data from the input document to an M×M data buffer 68. In the JPEG compression embodiment, the image blocking operation preferably operates to identify segments of 8 pixels by 8 scanlines. Once stored in a data buffer that is part of the image processing circuit, the data is next operated on by the image compression circuitry depicted as block 64. In block 64, the data may be operated on using various compression operations associated with the JPEG compression standard to accomplish the compression of the image data within a block. As will be described with respect to the following figures, certain aspects of the JPEG compression operation are preferably performed in conjunction with the image compression operations represented by JPEG compression block 64.

Once compressed, the M×M block of data is then preferably processed by image processor 66, where orthogonal rotation, mirroring and transposition of the data block is accomplished. Image processor 66 may be a software driven process operating on a CPU within the image processing system. The output of the image processor 66 is a coded unit of data that is subsequently stored in electronic precollation (EPC) memory 70 that, while depicted in the figure as a disk, may be any memory device suitable for storing one or more compressed image pages prior to printing by an IOT. As depicted in FIG. 2, IOT 74 is preferably a raster output scanning (ROS) print engine including a laser driving circuit 76 that controls or modulates laser 78 in accordance with decompressed digital data produced by image decompressor 72, which may also operate in conjunction with various aspects of image processor 66. As is well-known, the decompressor may receive the coded units of data and decode the data to produce digital data suitable for driving an image output terminal. The laser in the ROS-based IOT 74 is used to illuminate or expose a photoresponsive member 84 by reflecting the laser generated light beam off of the plurality of surfaces found on rotating polygon 80 so as to create, by scanning, a latent image on member 84. Once the latent image is produced, it would be developed in accordance with any of a number of methods known to those skilled in the art to produce a visible image. It will be further appreciated that the digital image data may be employed to drive or otherwise control any number of image output terminals, including color output devices where the data representing an image may include a plurality of color separations each processed and stored as a separate image plane or in luminance-chrominance form to further reduce storage requirements.

Figure 3:
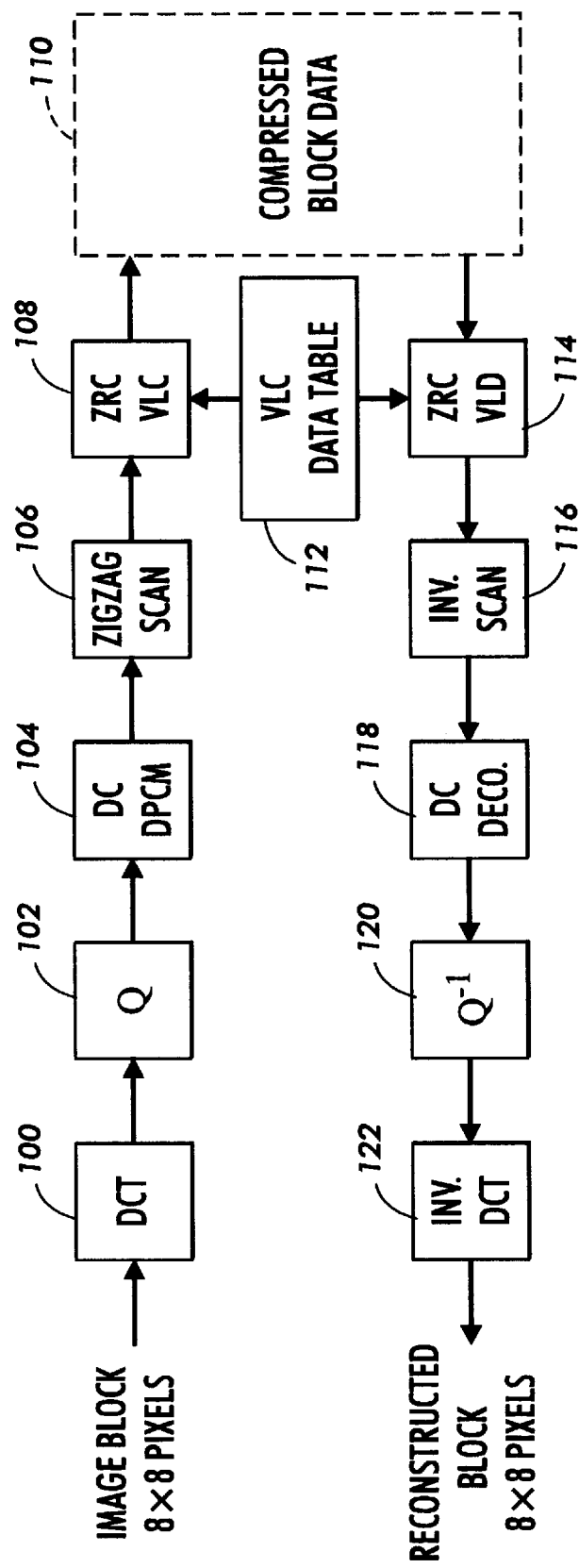
FIG. 3 is a flow chart depicting the various processing steps in a baseline JPEG compression/decompression system.

Having described the general operation of a printing system employing the present invention, attention is now turned to specific details of the operation of the JPEG compression and decompression blocks (64 and 72) in conjunction with image processor 66. In particular, with reference to FIG. 3 there is depicted a pair of opposite direction flowcharts illustrating the baseline JPEG operations as viewed with respect to the present invention. In particular, the input to the JPEG compression operation shown at the top of FIG. 3 assumes segmentation of the image into 8×8 blocks of data. The following description is directed to the processing of a single color image. However, it will be further appreciated that the present application has particular application to multi-colored images and the principles discussed herein may be extended to such multi-colored images in a straightforward manner.

Figure 4:
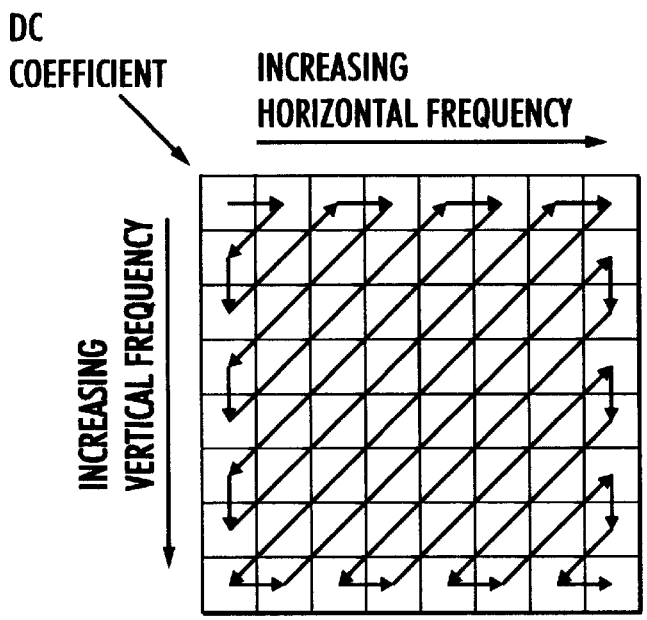
FIG. 4 is an illustration of the zigzag scanning path employed to vectorize the coefficients in a DCT coefficient matrix.

Next, at step 100 the data is transformed using a discrete cosine transform (DCT) operation. Following the DCT operation the DCT data is then quantized at block 102, using a Q-table input as previously described with respect to FIG. 1. Subsequently, the quantized coefficients are first analyzed to determine the DC coefficient which is reduced to a difference between the current DC coefficient and the DC coefficient of the immediately preceding data block (or 0 if the first block). This operation is accomplished at step 104. Then, at step 106 all quantized coefficients are re-scanned in accordance with the zigzag (diagonal) path depicted in FIG. 4. The output of the zigzag scanning at step 106 is then variable length coded (VLC) at step 108 so as to produce composite symbols reflected by the number of previous null coefficients in the zigzag path plus the amplitude of the subsequent non-zero AC coefficient. In a preferred embodiment, the VLC coding operation is accomplished using a VLC data table 112 where the variable length coding may be accomplished in a computationally efficient manner. Once the composite symbols are determined, including both the encoded DC and AC coefficients, they are stored, to produce the compressed data block or coded unit 110 that may be either stored or transmitted as previously noted.

In one embodiment, the compressed data block 110 may at a later time be required for reconstruction into an image for rendering, or an image from an unknown source may be provided for rendering, where such an image may need to be processed in accordance with features of the present invention. In such a case, the image would generally be retrieved from EPC memory and processed in accordance with the steps shown at the bottom of FIG. 3. There, it is indicated that the compressed block data is first variable length decoded at step 114, once again using the VLC data table 112, and subsequently inverse scanned at step 116 to produce an array of quantized coefficients. Subsequently, the DC difference coefficient is decoded, step 118, where the DC coefficient may then be determined based upon a decoding operation applied to the previous block (or data stored separately—as described in a copending application by Micco and Banton, previously incorporated by reference. Once the DC coefficient is determined, the inverse quantization operation at step 120 is employed to complete the generation of the set of DCT quantization coefficients. The coefficients are then employed by the inverse DCT step 122 in order to regenerate a representative 8×8 block of image data.

As will be appreciated from the description of the steps in the compression-decompression operations, one cannot determine where in the data stream representing a compressed image is the beginning of a particular string of data associated with an 8×8 block without first decoding all of the information relative to the preceding blocks. This is inherent in an encoding system wherein the length of each segment of data is variable, as is the case for the baseline JPEG compression operation. Thus, one must invariably decode the bit stream preceding a block's data before one can process the data for that block. However, even though there is a need for knowledge with respect to a particular block, the present invention is directed to increasing the computational efficiency of an image processing system by enabling certain image processing operations to be conducted on, or in conjunction with the compression or decompression of images—while the images are in the DCT domain.

Mirroring, rotation and transposition of images are image processing operations that lend themselves particularly well to implementation in the DCT domain. To further explain the basis for such processing, consider the following:

X is a matrix containing the 8×8 array of image pixels (signals) and D is the size-8 DCT matrix. Then, a 2-dimensional separable DCT operation may be represented by the equation $Y=DXD^T$, where Y is the matrix containing the 8×8 transformed coefficients and where the superscript T is employed to represent transposition.

Let $X_{90}$, $X_{-90}$, and $X_{180}$ be the notation for the rotation of image block X by 90 (clockwise), −90 (counterclockwise) and 180 degrees, respectively. Also, let $X_{VM}$ and $X_{HM}$ represent the result of, respectively, vertical and horizontal mirroring of block X. Thus, denoted by $Y_{90}$, $Y_{-90}$, $Y_{180}$, $Y_{VM}$ and $Y_{HM}$ are the transformed coefficients of $X_{90}$, $X_{-90}$, $X_{180}$, $X_{VM}$ and $X_{HM}$, respectively (e.g., $Yg_{90}=DX_{90}D^T$). Also, let J be the reversing matrix defined by $$J = \begin{bmatrix} 0 & & & \cdots & & & 1 \\ & & & & & 1 & \\ & & \cdot & & & & \\ & & \cdot & & & & \\ & & \cdot & & & & \\ & 1 & & & & & \\ 1 & & & \cdots & & & 0 \end{bmatrix}$$

and the matrix V which is a diagonal matrix with alternating elements +1 and −1, as $$V = \text{diag}\{1,-1,1,-1,1,-1,1,-1\}.$$

Then, it is possible to confirm that the DCT matrix has the following property:

$$D = VDJ$$

or in other words, half of the rows are even-symmetric and half are odd-symmetric.
Also true are the following relations:

$$X_{90} = JX^T;\ X_{-90} = X^T J;\ X_{180} = JXJ;\ X_{HM} = XJ;\ \text{and}\ X_{VM} = JX.$$

Having developed these general rules, the rules may then be algebraically manipulated to obtain simple relations that result in the rotation and mirroring operations in the DCT domain:

$$Y_{90} = VY^T;\ Y_{-90} = Y^T V;\ Y_{180} = VYV;\ Y_{HM} = YV;\ \text{and}\ Y_{VM} = VY.$$

remembering that VY is indicative of a sign change for every odd-numbered row of Y and that YV indicates a sign change for every odd-numbered column of Y. As will be further appreciated, applying these operations to the DCT coefficients in the DCT domain eliminates the need to carry out an inverse DCT transformation (e.g., step 122 of FIG. 3) merely to perform a basic image processing operation on the image in the spatial domain. Furthermore, the DC coefficient is unaffected by such operations and the sign change is independent of the quantization operation. Accordingly, the operations described may be applied directly to the decoded coefficients without the need to involve the processing intensive steps of quantization and DC coefficient determination.

Figure 5:
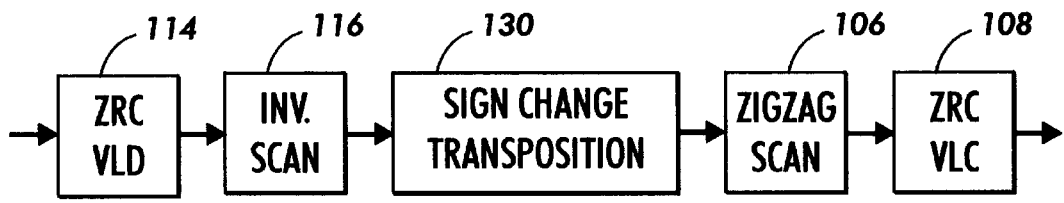
FIG. 5 is a flow chart illustrating the various steps to accomplish image processing in accordance with one embodiment of the present invention.

Turning next to FIG. 5, displayed therein is a flow chart illustrating the various processing steps associated with the processing of a JPEG compressed image. Assuming that the input to the operation is previously compressed image data, the first step is the variable length decoding of the zero run counted data found in the coded unit representing a block of the image, step 114. Subsequently, the run length decoded output from step 114 would be inverse scanned using reverse zigzag scanning to identify the various coefficient values. Then, in accordance with the previous description of the image processing operations that may be accomplished on the matrix-based coefficients, the sign change transposition step 130 may be employed to "process" the image before rescanning at step 106 and re-encoding at step 108. As will be appreciated, the latter two steps would not be required unless the intention was to obtain a rotated and re-compressed image.

Figure 6:
FIG. 6 is a flow chart illustrating a reduced-step process to accomplish image processing of compressed image data in accordance with an alternative embodiment of the present invention.

The present invention further contemplates the added advantage in computational efficiency that may be achieved if the aforedescribed image processing operations are accomplished in conjunction with the decoding or encoding processes carried out at steps 114 and 116 or 106 and 108, respectively. For example, referring to FIG. 6, it is possible to decode data relative to one diagonal of the image (zigzag path) at a time, step 150. The decoded diagonal coefficients may then be employed to accomplish the sign change and/or reversion of the data in accordance with the intended image processing operation, step 152, and the diagonal information reencoded as in step 154 to process the coded unit one diagonal at a time. It will be appreciated that the run length of zero coefficients may traverse the end of a diagonal and this fact would have to be accommodated by a storage mechanism accessible during the processing of the subsequent zigzag diagonal. Specifically, the run length of zero coefficients may be stored before completing the operations on a first diagonal, the first diagonal then being processed, the run length adjusted for the number of coefficients processed in the diagonal, and the remainder being employed to indicate the run length of zero coefficients in the subsequent diagonal.

Figure 7:
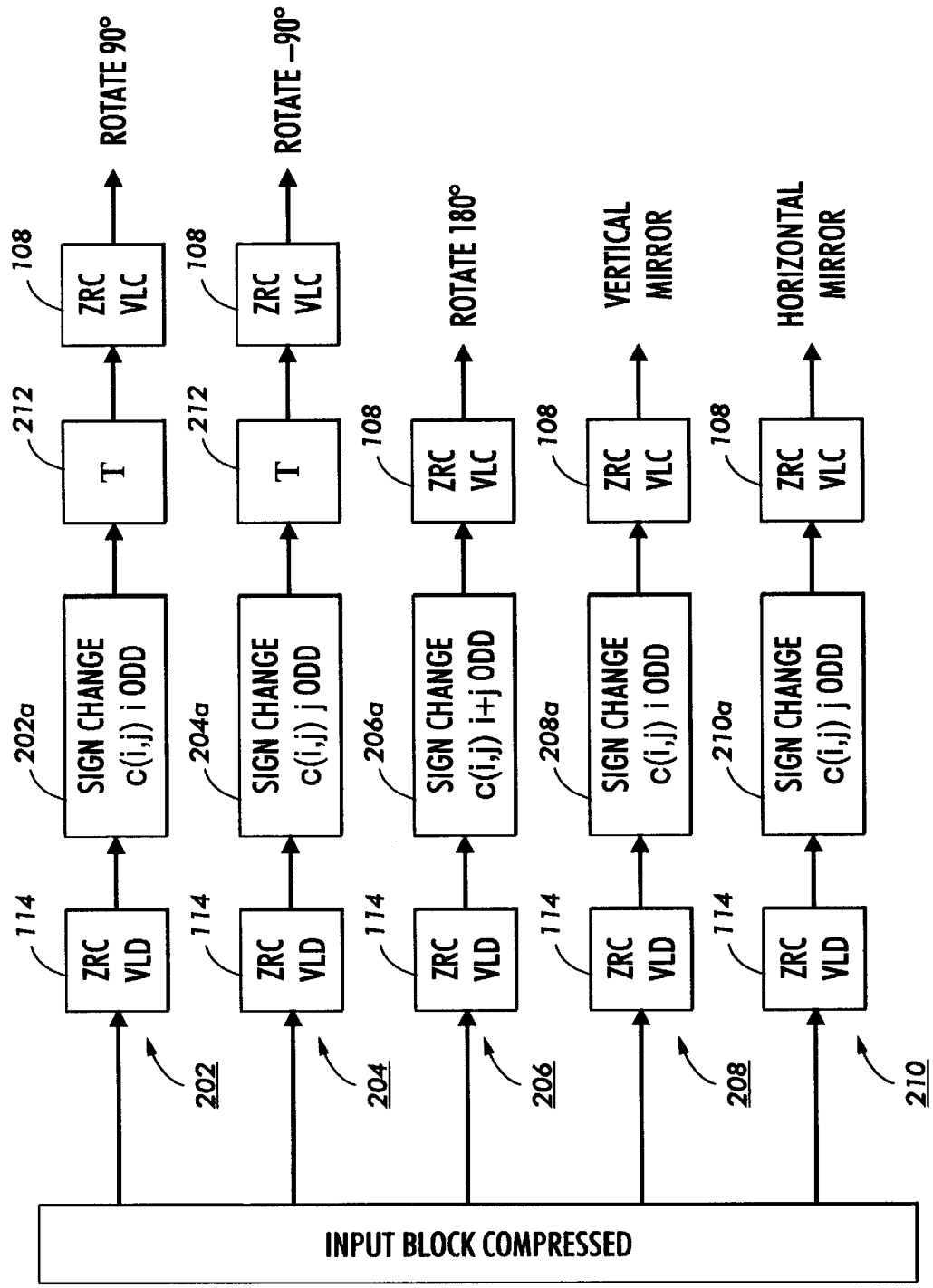
FIG. 7 depicts flowcharts for each of the various image processing operations that may be accomplished by the present invention.

The various image processing operations that may be accomplished in accordance with aspects of the present invention are illustrated in FIG. 7. While each of the operations may be further improved in accordance with the modifications illustrated in FIG. 6, the various operations are depicted using the baseline JPEG operations in order to simplify the explanation thereof. In the flowcharts of FIG. 7, the samples for the one-dimensional vector representing the compressed image block or coded unit are denoted z(n), and c(i,j) is the representation of the coefficient in the original row,column format. As an example, the inversion of the sign for all c(i,j) for i odd (reversing sign of odd-numbered rows) is equivalent to changing the sign of z(n) for n ∈ {2, 4, 7, 13, 16, 26, 29, 9, 11, 18, 24, 31, 40, 44, 53, 20, 22, 33, 38, 46, 51, 55, 60, 35, 36, 48, 49, 57, 58, 62, 63}. As will be appreciated by those skilled in the art the reversal of signs for odd-numbered columns can be accomplished in a similar manner.

In FIG. 7, the top-most process 202 is the process applied to accomplish a 90 degree rotation of the compressed input block or coded unit so as to produce a rotated coded unit. The above example for the reversal of sign for odd-numbered rows is represented in step 202*a*, while the transposition operation T is represented by step 212. Once transposed, the data would then be processed at step 108 to produce the variable length coded unit. Similarly, the remaining image processing operations are depicted as flow charts in FIG. 7. Process 204 illustrates the −90 degree rotation operation where the j-odd (reversal of odd numbered rows) operation of step 204*a* would be combined with the transposition operation 212 to rotate the coded unit data. Although not specifically illustrated, it will be further appreciated that the transposition operation 212 may be employed independently to accomplish a simple transposition of a block of compressed data.

Process 206 applies a sign change operation 206*a* for the odd numbered rows and columns in order to rotate the image by 180 degrees. The mirroring operations of processes 208 and 210 are accomplished by simply applying sign-change operations to the rows or columns depending upon whether vertical or horizontal mirroring is desired. Thus, the various image processing operations of orthogonal rotation and mirroring may be accomplished by processing the coefficients generated by a DCT transformation, without the need to completely decompress the image to the spatial domain. However, it will also be appreciated that the above description does not treat the manner in which the various blocks of an image must also be moved with respect to one another so as to not only have rotated pixels within a block but to move or otherwise change the relative positions of the blocks themselves.

The treatment of the inter-block rotation is possibly accomplished in the manner described by Micco et al in the copending application previously incorporated herein by reference. Alternatively, recognizing that it is possible to accumulate or track the sizes of the blocks and coefficients therein while processing the coded units, it is possible to store the offsets to various blocks and even pixels within the blocks. In either situation, it is possible then to readily address individual blocks within a coded image once the sizes of the blocks are known. Taking this a step further, it is also possible in the case of JPEG compressed data, to know the size of the coded unit representing each block by either preprocessing (e.g., parsing) the coded unit data, or by adding to the header of a JPEG compressed image file, a data structure that contains the size of each of the compressed blocks therein as described for example by R. deQueiroz in co-pending application Ser. No. 08/721,519, filed concurrently herewith and previously incorporated herein by reference. While such a structure would add to the size of the compressed image, the data contained therein would enhance the computational efficiency of operations that require the size of the coded units for each image block. Although the size of the coded unit must be determined to properly decode each coded unit for processing as described above, the size of the coded unit does not change as a result of the image processing operations, and the position of the re-encoded block in the output image can be calculated based upon the block sizes for each of the blocks. Once the block sizes are known, it is then possible to place, in a random access fashion, the re-encoded data into a processed image file in memory, where the location of the coded data can be determined based upon the sizes of all blocks that would precede it.

Figure 8:
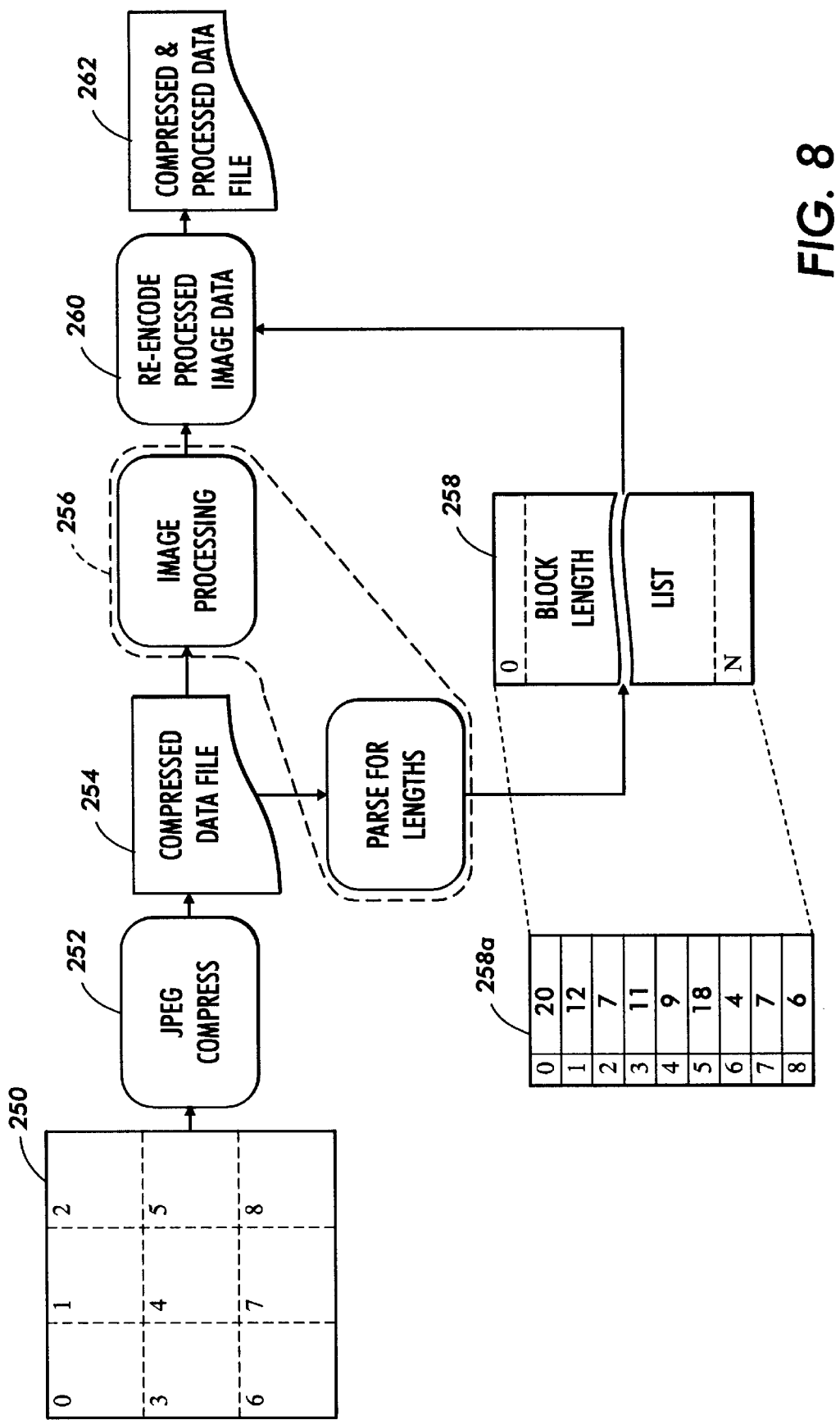
FIG. 8 is an exemplary illustration of the data flow necessary to assure that inter-block relationships are maintained after processing of JPEG encoded images.

A simplified example of this process is illustrated in FIG. 8. Shown therein is an input image 250 having only nine M×M blocks. Once compressed using JPEG compression (252), as represented by compressed data file 254, the image may be subsequently parsed or otherwise processed (256), during which time the sizes of each of the nine blocks will be determined, the data being stored in memory as a temporary list 258. After processing a coded unit, the data is re-encoded at step 260, and is rewritten to a compressed and processed data file 262. However, the rewriting operation will preferably be accomplished in the sequence in which the coded units are retrieved from the input data 254. Thus, the output must be written, not in the sequence in which the data is processed, but in a "random access" fashion to accomplish the interblock rotation. As further depicted in FIG. 8 by Table 258a the data indicates the block number from image 250 and the relative size of the block in words.

Considering the example of a 90-degree clockwise rotation operation to be performed on the compressed data 254, block 0 of image 250 would be moved from an upper-left corner of the input image to an upper-right corner of the output image. Moreover, the coded units for blocks 3 and 6 would precede the coded unit for block 0 along the top of the output image. Therefore, the data for the coded unit representing the compressed and processed data for image block 0 would have to be offset in the output data file 262 by fifteen words (11+4) so as to "reserve" space for the third and sixth blocks to be written later. As will be appreciated by those skilled in the art, various algorithms are applicable to determine the offset for any particular block within the output image based upon the image processing operation to be applied to the compressed image. Thus, it is possible to randomly access the output memory to write the blocks in the appropriate location In recapitulation, the present invention is a method for the processing of images that have been compressed using a discrete cosine transform operation, and particularly JPEG compressed images. In a preferred embodiment, the rotation of image blocks is accomplished by sign inversion and transposition operations to accomplish intrablock operations. Subsequently, one of a number of alternative methods is employed to accomplish the same image processing on an interblock level, thereby enabling the rotation, mirroring, or transposition of compressed images. The two stage process uses either a baseline JPEG system with enhancements or a hybrid processing method, thereby accomplishing the image processing in conjunction with compression or decompression operations and minimizing the need for large memory buffers. Accordingly, the technique has application to any number of systems, including digital printers and copiers where there may be a necessity to orthogonally rotate or mirror the digital image.

It is, therefore, apparent that there has been provided, in accordance with the present invention, a method and apparatus for the combined processing and compression/decompression of a digital image. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method for performing an image processing operation on compressed digital image data comprising a plurality of coded units, wherein each coded unit is a variable-length representation of the coefficients of a discrete cosine transform for a segment of a digital image, the method including the steps of:

retrieving from a memory a coded unit;

at least partially variable-length decoding the coded unit to produce a quantized coefficient matrix, wherein the step of variable length decoding further includes the identification of diagonal portions of a coefficient matrix;

processing the quantized coefficient matrix in accordance with the image processing operation to produce a processed coefficient matrix, wherein the steps of variable-length decoding and processing the quantized coefficient matrix are performed in conjunction with one another on a single diagonal portion of the image at a time;

variable-length encoding the processed coefficient matrix to produce a processed coded unit; and repeating the above steps for each of the plurality of coded units in the compressed digital image data to produce coded units of a processed, compressed image.

2. The method of claim 1, wherein the image processing operation is selected from the group consisting of:

tranposition;

clockwise orthogonal rotation;

counterclockwise orthogonal rotation;

180 degree rotation;

vertical mirroring; and horizontal mirroring.

3. The method of claim 1, wherein the image processing operation is an orthogonal clockwise rotation and where the processing of the quantized coefficient matrix includes:

changing the sign of coefficients in selected rows of the quantized coefficient matrix; and transposing the quantized coefficient matrix.

4. The method of claim 1, wherein the image processing operation is an orthogonal counterclockwise rotation and where the processing of the quantized coefficient matrix includes:

changing the sign of coefficients in selected columns of the quantized coefficient matrix; and transposing the quantized coefficient matrix.

5. The method of claim 1, wherein the image processing operation is a 180 degree rotation and where the processing of the quantized coefficient matrix includes:

changing the sign of coefficients in selected rows of the quantized coefficient matrix; and changing the sign of coefficients in selected columns of the quantized coefficient matrix.

6. The method of claim 1, wherein the image processing operation is a vertical mirroring of the input image and where the processing of the quantized coefficient matrix includes changing the sign of coefficients in selected rows of the quantized coefficient matrix.

7. The method of claim 4, wherein the image processing operation is a horizontal mirroring of the input image and where the processing of the quantized coefficient matrix includes changing the sign of coefficients in selected columns of the quantized coefficient matrix.

8. The method of claim 1, further including the steps of:

identifying a storage area in memory for the processed, compressed image;

determining the offset, from a beginning of the storage area, at which to store each of the processed coded units, said offset being determined as a function of the image processing operation applied to the compressed image data; and storing the image data for each coded unit at the location indicated by the associated offset so as to produce a processed, compressed image.

* * * * *